W. MOERSCHER.
WATER POWER SYSTEM.
APPLICATION FILED NOV. 24, 1916.
1,434,138.
Patented Oct. 31, 1922.
2 SHEETS—SHEET 2.
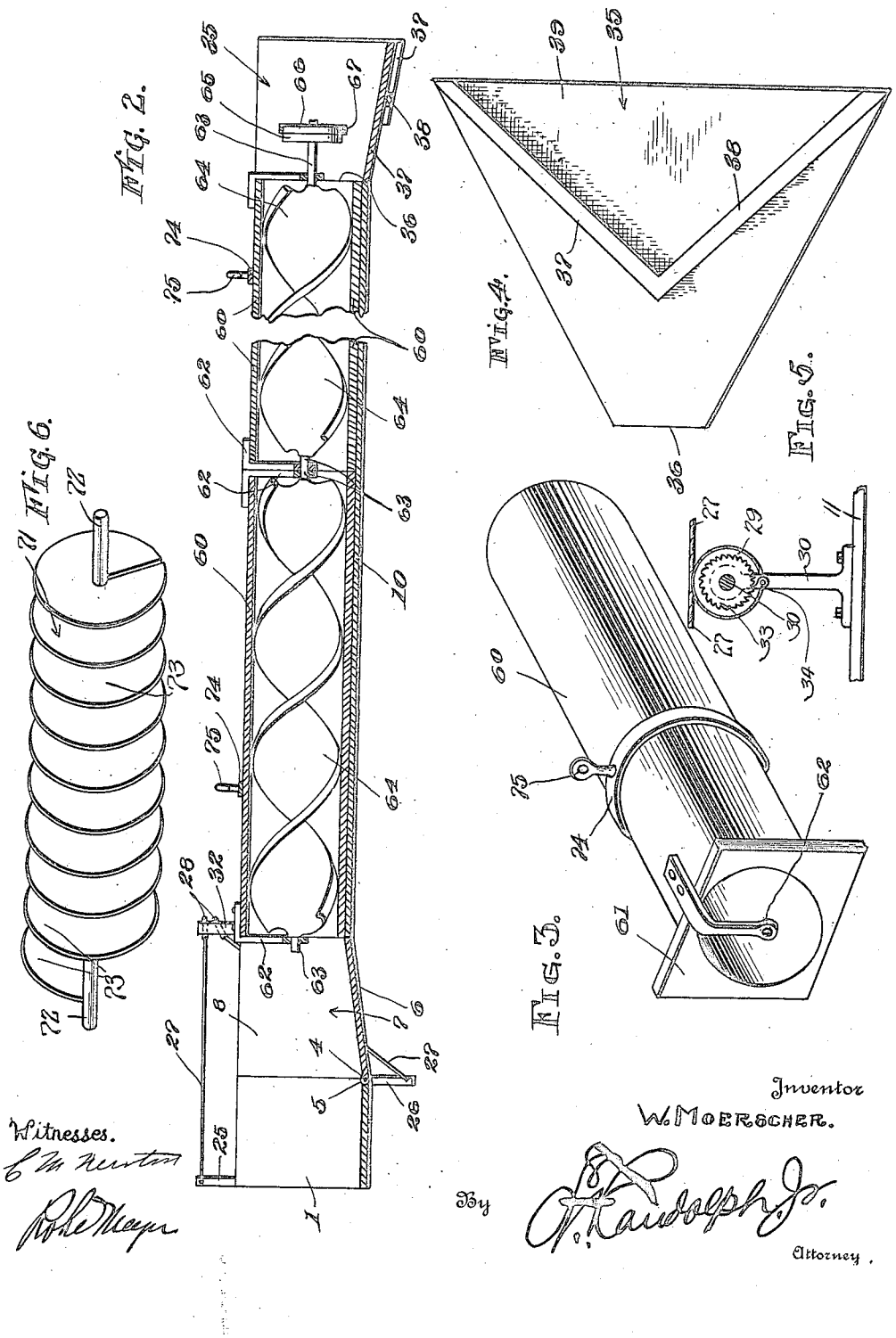

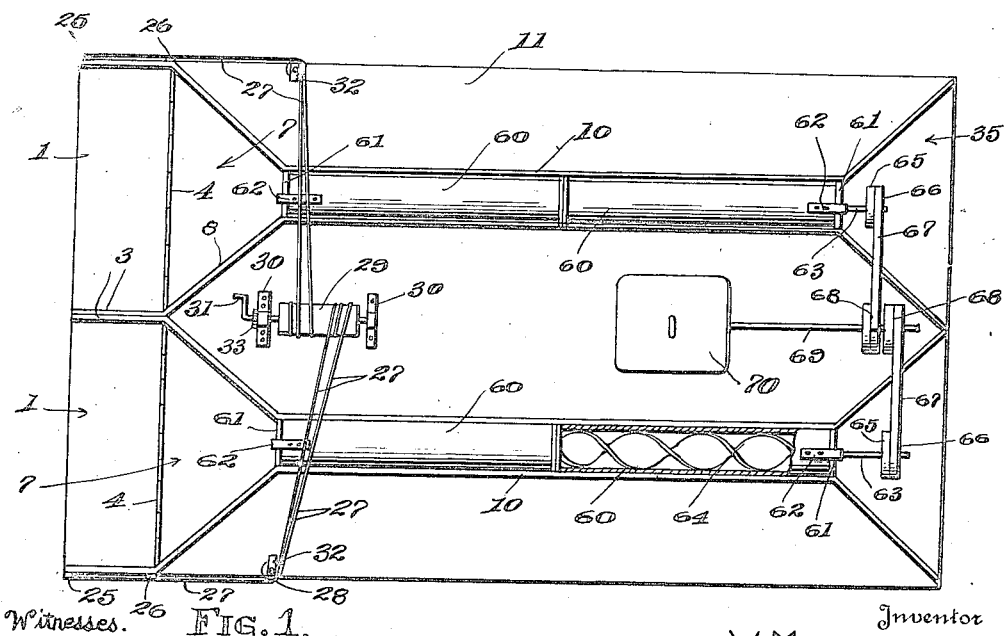

Patented Oct. 31, 1922.

1,434,138

UNITED STATES PATENT OFFICE.

WILLIAM MOERSCHER, OF BELVIDERE, NEW JERSEY.

WATER-POWER SYSTEM.

Application filed November 24, 1916. Serial No. 133,222.

*To all whom it may concern:*

Be it known that I, WILLIAM MOERSCHER, a citizen of the United States, residing at Belvidere, in the county of Warren and State of New Jersey, have invented certain new and useful Improvements in Water-Power Systems; and I do hereby declare the following to be a full, clear, and exact description of the invention, such as will enable others skilled in the art to which it appertains to make and use the same.

This invention relates to water power apparatus designed to utilize the flow of water of a flowing stream to produce power, and the object of the invention is to produce a device of the above stated character which will be strong, durable and efficient in use, and which may be manufactured and sold at a comparatively low cost.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a top plan view of one of the water power plants or apparatus; illustrating the use of a screw.

Figure 2 is a longitudinal sectional view taken through one of the raceways and screw means therein;

Figure 3 is a detail perspective view of the tubular raceway or flume.

Figure 4 is a bottom plan view of the outflow.

Figure 5 is an enlarged detail illustrating the means for raising the inflow.

Figure 6 is a detail view of a spiral water wheel which may be employed in the construction of the device.

Referring more particularly to the drawings, 1 designates the inlet or inflow guide of the apparatus, which consists of a bottom 2 and upstanding sides or ends 3. The water inlet 1 is as near watertight as possible, and it has its rear inner edge hingedly connected as shown at 4 to the outer edge 5 of the bottom 6 of the concentrating guide or flow 7, so it can be raised and lowered, in order to start and shut off the power, by starting or stopping the flow of water through the plant. When raised to shut off the water flowing through the plant, the inlet 1 should not be raised higher than about an angle of 40 to 45 degrees, and when lowered to let the water flow therethrough, and through the concentrating guide 7, the bottom 2 should be level with the outer edge 5 of the concentrating guide or flow 7. The edges or ends of the sides 3 of the inlet 1 overlaps the outer edges of the upstanding sides 8 of the concentrating guide 7, so as to form as near as possible, a watertight joint therebetween.

The size of the opening in the inlet or inflow guide 1 may be increased or decreased to regulate the volume of water passing through the flumes 10.

The concentrating guide 7 concentrates the water to a smaller space and being thus concentrated it naturally increases its speed of travel. The more the flow of water is concentrated to a smaller space the greater the speed it has to develop to pass through the flume or raceway.

The concentrating guide or flow 7 includes the bottom 6, the outer edge of which is the same width as the inlet guide 1, which bottom narrows, by an angle of approximately 45 degrees to the rear part, as clearly shown in Figure 1 of the drawings. The upstanding sides 8 are fastened to the bottom in any suitable watertight manner, and the bottom 6 angles upwardly as clearly shown in Figure 2.

The water is delivered from the reduced delivery end of the concentrating flow or guide 7 to the raceway or flume 10, which is carried by any suitable type of raft or float 11 which may be constructed of squared logs, or of hollow buoyant members.

The inlet guide 1 has upstanding posts 25 connected to its forward corners, and downwardly extending posts 26 connected to its rear corners, to the ends of which posts are are connected cables 27, which cables pass over pulleys 28 and are connected to a drum 29. The drum 29 is rotatably supported by suitable bearings 30, and it has a crank handle 31 connected thereto for manually rotating the drum for winding the cables or cords 27 thereon or unwinding them from the drum. The pulleys 28 are carried by suitable standards 32 and they guide the cables to insure the proper raising and lowering of the inlet flow or guide 1. A ratchet 33 is carried by one end of the drum 29 and a pawl 34 is carried by one of the bearings 30 for engagement with the ratchet for preventing accidental unwinding rotation of the drum.

The water flows through the flume or raceway 10 and into an outflow or outlet guide 35, which is constructed similar in shape to the cencentrating guide 7, having its small end 36 communicating with the outlet end of the raceway 10. The outlet flow widens outwardly, toward its delivery end and thus will naturally lower the height of the water flowing through the raceway to the level of the stream, at the same time producing a draft on the flow in the raceway 10 which draft is increased by placing two cross pieces 37 and 38 on the under surface of the bottom 39 of the outflow or outlet guide 35 as clearly shown in Figure 6 of the drawings. The strips 37 and 38 have their inner ends connected and they angle outwardly, so that they will displace a certain amount of the water in the stream, guiding it outwardly beyond the edges of the outlet guide 35, which gives the water coming through the outlet guide more of a chance to flow freely without first pressing its way for space and to find its level with the flow in the stream, and without interfering with the velocity or speed of the flow of water through the flume or raceway 10. The outlet flow or outlet guide 35 declines approximately 4 or 5 degrees, as clearly shown in Figure 2 of the drawings, and at an incline equal to the upward incline of the concentrating guide 7.

In each flume 10, a tubular raceway 60 is provided which has a rectangular end plate 61 attached thereto for snugly fitting within the flume or raceway 10. The tubular or cylindrical raceway 60 has bearing brackets 62 attached to its upper surface and depending downwardly at is end, to its longitudinal center, which bearings form supports for a shaft 63 which extends longitudinally through the tubular or cylindrical flume and has a twist wheel 64 mounted thereon. The blades of wheel 64 are twisted similar to the twist of an auger, so that the water flowing through the circular flume will engage the twisted blades 64 and rotate the wheel and consequently rotate the shaft 63. The sections of wheel 64 of course are positioned in sections 60 and the shaft 63 is passed therethrough and through the bearing brackets before such sections are keyed or otherwise fastened to shaft 63 for rotation therewith. Due to the fact that the shaft 63 fastens to the sections of wheel 64, the flume sections are secured together thereby against relative longitudinal movement. The shaft 63 has a pair of pulleys 65 and 66 mounted thereon, one of which is a loose pulley, and the other of which is keyed to the shaft. A belt 67 is provided for passing about either of the pulleys 65 and 66 and about either a loose or keyed pulley 68 which is carried by a shaft 69. The shaft 69 is operatively connected to a dynamo or analogous machine 70. The pulleys 65 and 66 are positioned within the outflow or outlet guide 35, as clearly shown in Figure 1 and they are positioned so that as small portions thereof will be submerged in the outflowing water as possible.

If it is so desired, a spiral wheel as illustrated in Figure 6 of the drawings may be employed in lieu of the twisted wheel 64, without departing from the spirit of this invention. The spiral wheel generically indicated by the numeral 71 includes a central shaft 72 on which are mounted a plurality of spiral blades 73, which will rotate the shaft 72, by the water passing between and from one of the spiral blades to the other.

The hangers or bearings 62, are as narrow as possible, so as to prevent as little obstruction to the water flowing through the tubular or cylindrical flume 60. The tubular or cylindrical flume 60 has rings 74 mounted thereabout, upon which eyes 75 are formed, to which eyes cables, hooks or the like may be attached for removing the tubular flumes for the purpose of replacing broken parts.

The tubular flumes 60 are made sectional, so that the capacity of an apparatus may be increased or decreased according to demand without discarding the entire apparatus and installing larger or small power plants, by simply increasing or decreasing the number of sections of the plant or apparatus and also by forming the plant or apparatus in sections, any part can at any time be replaced and put the entire system in good condition.

Summing up, generically the operation of the device is as follows; when it is desired to operate the plant, the inlet 1 is lowered, through the medium of the drum 29 so that the proper amount of water will flow therethrough, into the concentrating guide 7. The speed of the plant can be thoroughly regulated by the raising and lowering of the inlet 1, which will regulate the amount of water flowing into the device, and when the inlet is raised for allowing only one-half of the usual capacity of water to flow therein, approximately one-half of the speed of rotation of the water wheels will be obtained, owing to the fact that the concentration of the water will be less than where the full capacity of water is forced through the flumes or race-ways.

From the foregoing description taken in connection with the accompanying drawings, the advantages of construction and of the method of operation of the improved water power system will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical coditions provided such alterations are comprehended within the scope of what is claimed.

What is claimed is:—

Apparatus of the class described having a flume with upstanding side walls and open at the top, alining conduit sections therein of substantially tubular form, said sections at one end having substantially square heads to fit within the flume and in contact with said side walls whereby the sections are mounted against rotation relatively to the flume, bearings depending from the sections adjacent their ends, a power member disposed in the sections for rotation by impingement of water therewith, a shaft for said power member journaled in said bearings, a power-imparting means adjacent one end of said shaft, and said flume below said means being deflected away from said means for the purpose specified.

In testimony whereof I affix my signature in presence of two witnesses.

WILLIAM MOERSCHER.

Witnesses:
JOSEPH SCHECH,
CHARLES O. LANE.